US012682088B2

(12) United States Patent
Inokuchi et al.

(10) Patent No.: US 12,682,088 B2
(45) Date of Patent: Jul. 14, 2026

(54) POLICY CONSISTENCY VERIFICATION APPARATUS, POLICY CONSISTENCY VERIFICATION METHOD, AND POLICY CONSISTENCY VERIFICATION PROGRAM

(71) Applicant: NEC Corporation, Tokyo (JP)

(72) Inventors: Masaki Inokuchi, Tokyo (JP); Shohei Mitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 234 days.

(21) Appl. No.: 18/413,193

(22) Filed: Jan. 16, 2024

(65) Prior Publication Data

US 2024/0249008 A1 Jul. 25, 2024

(30) Foreign Application Priority Data

Jan. 23, 2023 (JP) ................................. 2023-007807

(51) Int. Cl.
*G06F 21/62* (2013.01)

(52) U.S. Cl.
CPC .......... *G06F 21/62* (2013.01); *G06F 21/6209* (2013.01); *G06F 21/6227* (2013.01)

(58) Field of Classification Search
CPC .. G06F 21/62; G06F 21/6209; G06F 21/6227; G06F 16/2458; G06N 3/00; G06N 5/00
See application file for complete search history.

(56) References Cited

U.S. PATENT DOCUMENTS

| | | | | |
|---|---|---|---|---|
| 2014/0249875 A1* | 9/2014 | Junker | ................... | G06Q 10/06 |
| | | | | 705/7.11 |
| 2019/0007443 A1* | 1/2019 | Cook | .................. | H04L 41/0894 |
| 2024/0169299 A1* | 5/2024 | Vaishnav | ................ | G06F 9/453 |

FOREIGN PATENT DOCUMENTS

| | | | | | |
|---|---|---|---|---|---|
| CA | 2292272 | A1 * | 6/2000 | ............. | H04L 41/12 |
| CA | 3003547 | A1 * | 5/2017 | ......... | H04L 63/1425 |
| JP | 3546787 | B2 * | 7/2004 | ......... | G06F 21/6218 |
| JP | 2004334264 | A | * | 11/2004 | |
| JP | 2008-065448 | A | | 3/2008 | |
| JP | 2013-171401 | A | | 9/2013 | |
| JP | 2015-502620 | A | | 1/2015 | |
| JP | 2020-525898 | A | | 8/2020 | |

* cited by examiner

*Primary Examiner* — Jayesh M Jhaveri
(74) *Attorney, Agent, or Firm* — Sughrue Mion, PLLC

(57) ABSTRACT

A policy consistency verification apparatus includes a policy conversion part configured to generate an If-Then rule approximating a policy function used as an input, wherein the policy function is generated from policy definition defining attribute value of access and a rule regarding accessibility to obtain an output of accessibility from inputs of the attribute value; and an error sample generation part configured to verify consistency between the If-Then rule and the policy definition to generate inconsistent attribute value as an error sample.

11 Claims, 11 Drawing Sheets

Figure 5:
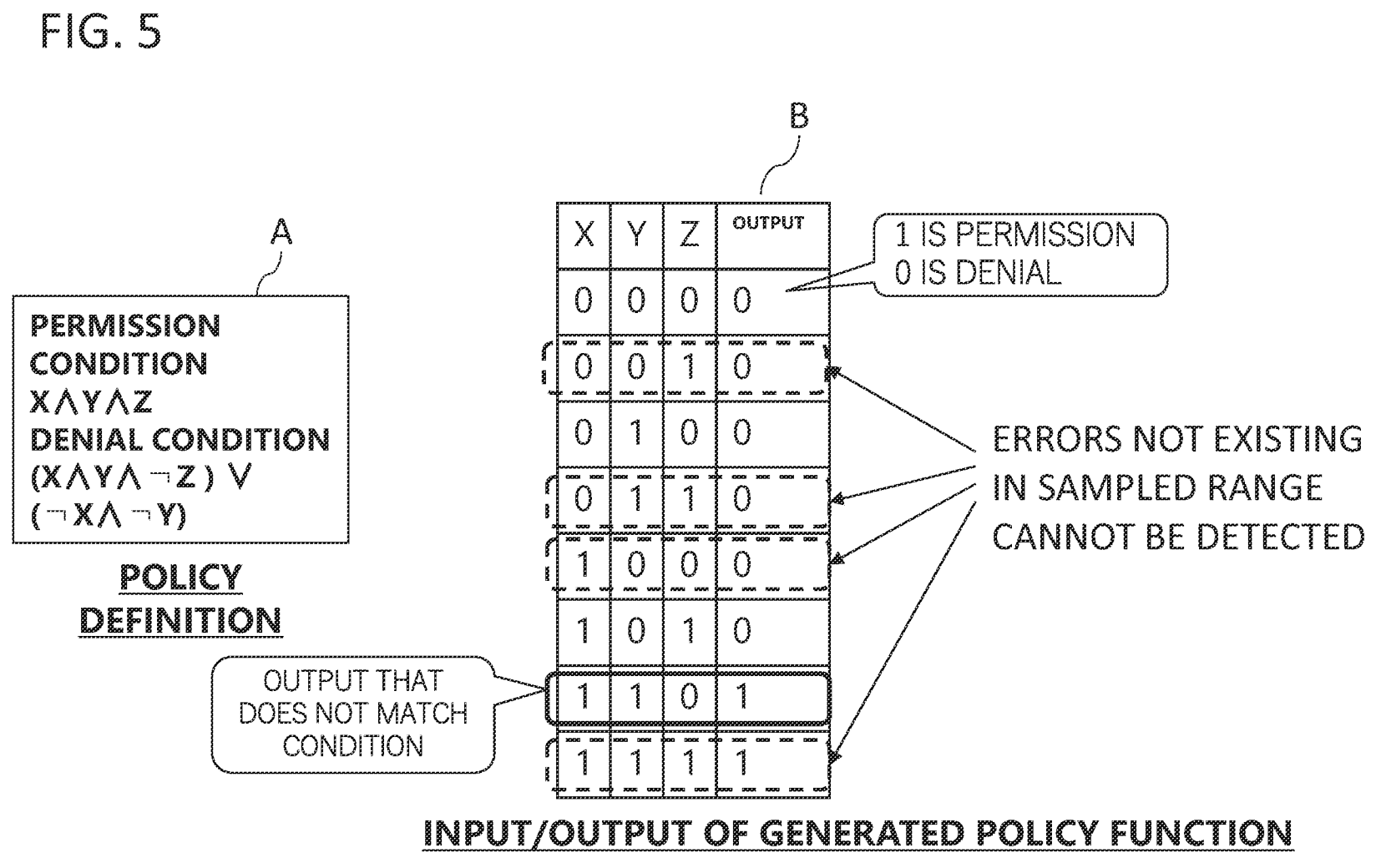

POLICY DEFINITION

PERMISSION CONDITION
$X \wedge Y \wedge Z$

DENIAL CONDITION
$(X \wedge Y \wedge \neg Z) \vee (\neg X \wedge \neg Y)$

B

1 IS PERMISSION
0 IS DENIAL

ERRORS NOT EXISTING
IN SAMPLED RANGE
CANNOT BE DETECTED

OUTPUT THAT
DOES NOT MATCH
CONDITION

| X | Y | Z | OUTPUT |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 1 |
| 1 | 1 | 1 | 1 |

INPUT/OUTPUT OF GENERATED POLICY FUNCTION

A

PERMISSION CONDITION
X∧Y∧Z
DENIAL CONDITION
(X∧Y∧¬Z)∨(¬X∧¬Y)

DEFINITION OF POLICY

C

PERMISSION CONDITION
OF POLICY FUNCTION
(X∧Y)
DENIAL CONDITION
OF POLICY FUNCTION
¬X∨(X∧¬Y)
IF THEN RULE

DECISION TREE
BASED ON SAMPLES

INPUT/OUTPUT OF GENERATED POLICY FUNCTION

POLICY CONSISTENCY VERIFICATION APPARATUS, POLICY CONSISTENCY VERIFICATION METHOD, AND POLICY CONSISTENCY VERIFICATION PROGRAM

FIELD

Description of Related Application

The present invention is based on claiming the priority of Japanese Patent Application No. 2023-007807 (filed on Jan. 23, 2023), and the entire contents of the application are incorporated in this application by reference.

The present invention relates to a policy consistency verification apparatus, a policy consistency verification method and a policy consistency verification program.

BACKGROUND

Data access control is an important technology to keep security at high state. There is one approach to access control including a method generating policy definition showing attribute(s) of a user to whom access is permitted and/or access destination resources (such as affiliation and/or job title, etc.) and then generating a policy function outputting access permission or denial by using a combination of the attributes as input based on this policy definition to perform access control using this policy function.

[PATENT LITERATURE 1] JP2020-525898A

SUMMARY

Note that, each disclosure of the above cited literature is incorporated herein by reference thereto. The following analysis has been performed by the present inventors.

By the way, even though the generated policy function is generated from the policy definition, the possibility still cannot be denied that the generated policy function may reflect the policy definition not correctly. Therefore, it is necessary to verify the consistency between the policy function and the policy definition, however, it is not practical to verify the consistencies for all combinations of attributes (such as affiliation and job title) used to determine accessibility of the users and to the resources, etc. Thus, it becomes practical to select several samples from the combinations of these attributes (such as affiliation and job title) and to verify consistencies of the combinations. Then, it is impossible to verify the consistencies of the combinations leaked from the samples, and it is possible to encounter the problem of overlooking these states permitted in the policy function, although those states are stipulated to be denied in the policy definition. In addition, a method for determining propositional logic from sets of security permissions to be comparably verified and for verifying the equality between propositional logics is described in Patent Literature 1.

Thus, it is not easy to verify the consistency between the policy function and the policy definition. Therefore, a method for efficiently verifying the consistency between the policy function and the policy definition is desired.

It is an object of the present invention to provide a policy consistency verification apparatus, a policy consistency verification method, and a policy consistency verification program for contributing efficiently to verify the consistency between the policy function and the policy definition, in view of the above-described problem.

In a first aspect of the present invention, there is provided a policy consistency verification apparatus, comprising a policy conversion part, and an error sample generation part. The policy conversion part is configured to generate an If-Then rule approximating a policy function used as an input, wherein the policy function is generated from policy definition defining attribute value of access and a rule regarding accessibility to obtain an output of accessibility from inputs of the attribute value. The error sample generation part is configured to verify consistency between the If-Then rule and the policy definition to generate inconsistent attribute value as an error sample.

In a second aspect of the present invention, there is provided a policy consistency verification method comprising a policy conversion and an error sample generation. The policy conversion generates an If-Then rule approximating a policy function used as an input, wherein the policy function is generated from policy definition defining attribute value of access and a rule regarding accessibility to obtain an output of accessibility from inputs of the attribute value. The error sample generation verifies consistency between the If-Then rule and the policy definition to generate inconsistent attribute value as an error sample.

In a third aspect of the present invention, there is provided a policy consistency verification program that causes a computer to verify a policy consistency, the computer comprising a processor that execute a program and a memory that stores the program, the program comprising a policy conversion process and an error sample generation process. The policy conversion process generates an If-Then rule using a policy function as an input to approximate the policy function, wherein the policy function is generated from a policy definition defining a rule regarding an attribute value of an access and an accessibility. The error sample generation process verifies consistency between the If-Then rule and the policy definition to generate inconsistent attribute value as an error sample.

Note that, this program can be stored on a storage medium readable by a computer. The storage medium can be non-transitory such as a semiconductor memory, a hard disk, a magnetic recording medium or an optical recording medium. The present invention can also be realized as a computer program product.

According to the aspects of the present invention, there can be provided the policy consistency verification apparatus, the policy consistency verification method, and the policy consistency verification program for contributing efficiently to verify the consistency between the policy function and the policy definition.

BRIEF DESCRIPTION OF DRAWINGS

FIG. 5 is a diagram exemplifying a conventional method for verifying policy consistency using a sample.

EXAMPLE EMBODIMENTS

Figure 1:
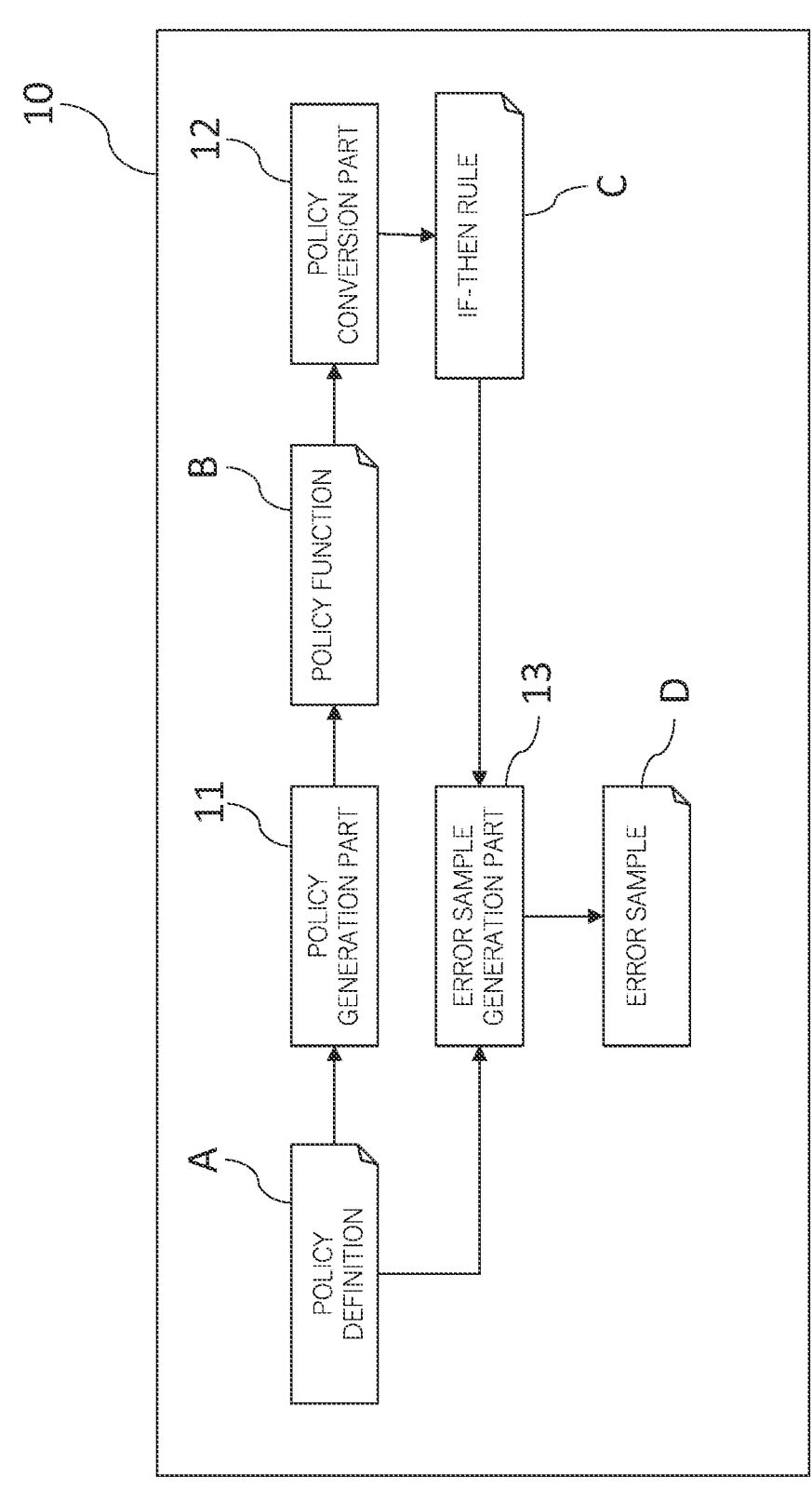
FIG. 1 is a schematic configuration diagram exemplifying a policy consistency verification apparatus according to a first example embodiment.

Hereinafter, example embodiments of the present invention will be described with reference to the drawings. However, the present invention is not limited to the example embodiments described below. Further, the same or corresponding elements are appropriately denoted by the same reference numerals in each drawing. In addition, it should be noted that the drawings are schematic, and the relationship of the dimensions of each element, the proportions of each element, etc. may differ from the real ones. Even between drawings, the elements that differ in the relationship or ratio of dimensions to each other may be included.

First Example Embodiment

FIG. 1 is a schematic configuration diagram exemplifying a policy consistency verification apparatus according to a first example embodiment. As shown in FIG. 1, a policy consistency verification apparatus 10 comprises a policy generation part 11, a policy conversion part 12 and an error sample generation part 13.

The policy generation part 11 is an arithmetic part generating a policy function B as a machine learning model based on the policy definition A. The policy definition A is a file defining attribute values of access and a rule regarding accessibility, and it is generated in advance to realization a desired access control. The policy definition A can be typically IF-Then format rule(s) such that permits or denies access to one or more access attributes with a condition that they are within a certain range of values. In this case, the condition can be described using propositional logic formula or predicate logic formula. Attribute values of the access can include attributes of access source users (department and position, etc.), attributes of access source terminals (department, operating system and inherent vulnerable integers, etc.), attributes of the access destination resources (affiliation and type of information held, etc.), access methods (application and communication protocol, etc.) and actions (read, write, execute, etc.). On the other hand, a policy function B is a function obtaining outputs of accessibilities from inputs of attribute values, and an access control inputs the attribute values of the access requested to the policy function B, and the accessibilities are determined according to outputs of obtained accessibilities.

The policy conversion part 12 receives the policy function B as input to generate an If-Then rule(s) C approximating the policy function B. The error sample generation part 13 verifies the consistency between the If-Then rule(s) C and the policy definition A to generate an inconsistent attribute value as an error sample D.

Figure 2:
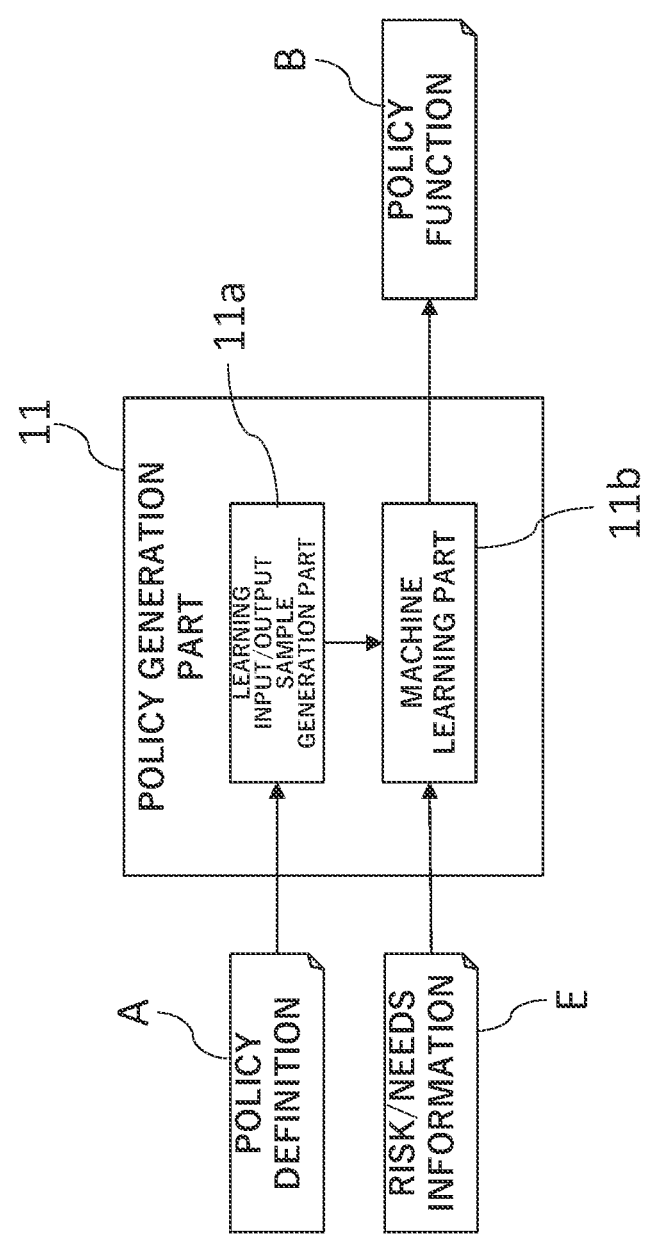
FIG. 2 is a diagram showing a configuration exemplifying a policy generation part.

FIG. 2 is a diagram showing a configuration exemplifying a policy generation part. As shown in FIG. 2, the policy generation part 11 comprises a learning input/output sample generation part 11a and a machine learning part 11b. The learning input/output sample generation part 11a generates input/output sample(s) from the policy definition A. For example, the learning input/output sample generation part 11a obtains accessibility Xi, in case where randomly generating N of combinations of attribute values (A1 to AN) and performing determination for the attribute value combination Ai ($1 \leq i \leq N$) according to policy definition A. Here, randomly generating combinations of attribute values refers to randomly selecting values from a domain set in advance for each attribute. Further, N is a preset integer value equal to 1 or more. The combinations of attribute values A1 to AN and accessibilities X1 to XN are input/output sample(s) generated by a learning input/output sample generation part 11a. Note that, in case where priorities are set for the policy definition A, the higher the priority, the more attribute combination sample(s) corresponding to the referenced policy definition A can also be generated.

A machine learning part 11b trains a neural network model using the input/output of the sample(s) generated by the learning input/output sample generation part 11a to output the trained neural network model as a policy function B. For example, the policy function B can be configured as a function returning a value that is equal to 0 or more and equal to 1 or less for an attribute value combination. In this case, it can be determined that access is permitted in case where it is equal to the reference value or greater than the reference value, and access is denied in case where it is less than a reference value. Note that, the machine learning part 11b can also use the risk/needs information E. For example, the risk/needs information E can be given as scores indicating tendencies to permit or to deny accesses to the values of particular attributes. It is also possible to use a monotonic model for these score data. By using the risk/needs information, it becomes possible to generate policies reflecting trends of risks and needs that are not clearly stated in the policy definitions. On the other hand, the policy function thus generated may be trained so as to return determinations partially deviating from the determinations of the policy definition A during the learning process.

Figure 3:
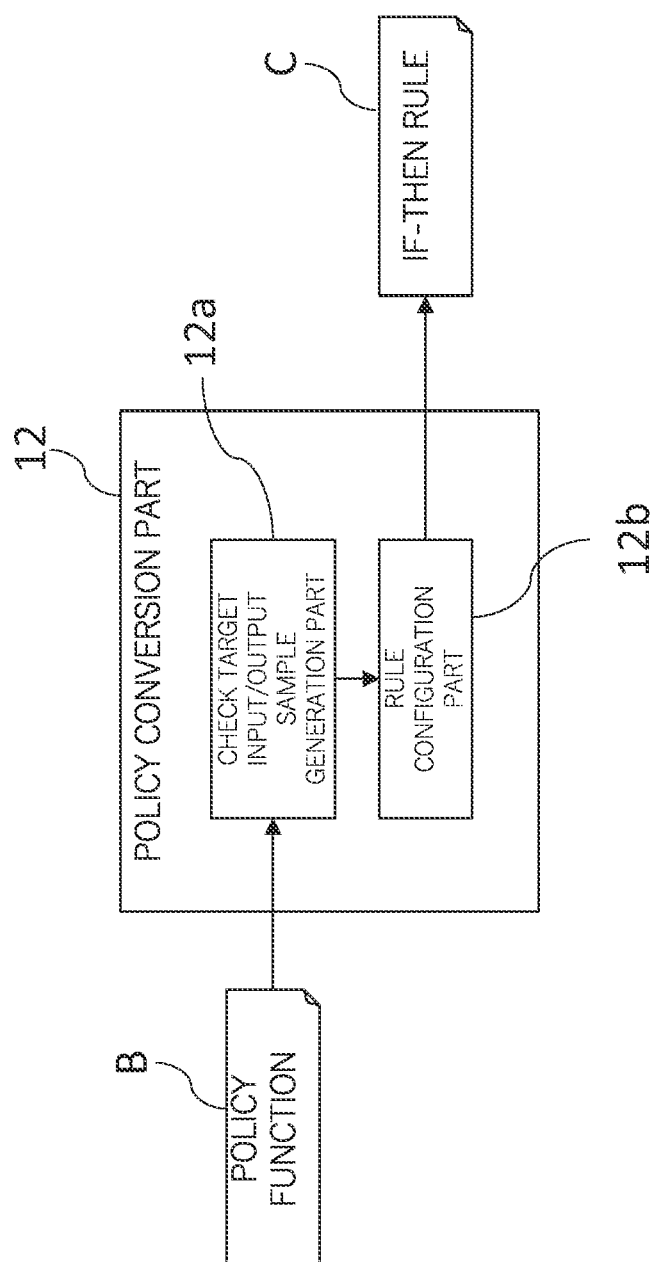
FIG. 3 is a diagram showing a configuration exemplifying a policy conversion part.

FIG. 3 is a diagram showing a configuration exemplifying a policy conversion part. As shown in FIG. 3, the policy conversion part 12 comprises a check target input/output sample generation part 12a and a rule configuration part 12b. The check target input/output sample generation part 12a randomly generates M of combinations of attribute values (B1 to BM) to obtain outputs Yi ($1 \leq I \leq M$) of accessibilities in case where performing determinations for the combinations of attribute values Bi ($1 \leq i \leq M$) according to the policy function B. The combinations of attribute values Bi ($1 \leq i \leq M$) and accessibilities Yi ($1 \leq i \leq M$) become the input/output samples Si ($1 \leq i \leq M$) generated by the check target input/output sample generation part 12a. The rule configuration part 12b generates the If-Then rule(s) C in the If-Then format rule(s) for determining accessibilities using the sample(s) generated by the check target input/output sample generation part 12a. For example, the rule configuration part 12b can adopt a method for configuring decision tree based on the generated sample(s) to generate the If-Then format rule(s) based on the decision tree. Further, a classification and regression tree (CART) or the like can be used as method for configuring the decision tree. As an example, in case where configuring the decision tree using CART, the combinations of attribute values B1-BN are used as explanatory variables. In case where the decision tree is configured as the regression tree, outputs Y1-YN of accessibility are used as objective variables. In case where the decision tree is configured as a classification tree, the values Y'1-Y'N are used as target variables, wherein each of the outputs Y1-YN is converted into one of two values permitting the access in case where the target variable is equal to the reference variable or more, or denying the access in case where the target variable is less than the reference variable. In case where CART is used, condition Ck using explanatory variables is associated with each node K except the leaf node. A condition is set to the condition Ck so that impurity or dispersion of the target variables included in the divided sample(s) are reduced in case where sample(s) associated with the referenced node is/are divided. Here, all input/output samples S are associated with root node, and each of subsets of the samples S repeatedly divided under the condition in each of the nodes from a root node to a referenced node associated with each of nodes other than the root node. In the leaf node, representative value is calculated based on the target variables included in an associated samples S. In the case of the classification tree, mode of the objective variables associated with the leaf node can be the representative value. In the case of the regression tree, mean or median of the objective variables can be used as a representative value.

As for the If-Then rule(s), the conditions of the If-Then rule(s) can be the condition (If clause) obtained by combining each of the conditions of nodes from the root node of the decision tree to the leaf node by logical AND. In this case, the representative value of the referenced leaf node can be the determination result (Then clause) by the If-Then rule(s), in the case of the classification tree, in case where the condition of the If-Then rule(s) is satisfied. In the case of the regression tree, in case where the representative value of the referenced leaf node is greater than the reference value or equal to the reference value, access permission can be the determination result (Then clause) in case where condition by the If-Then rule(s) is satisfied, or in case where representative value of the leaf node is less than the reference value, access denial can be the determination result. In this case, the If-Then rule(s) of which number is equal to the number of the leaf nodes will be generated. Note that, so far as the determination result matches, these If-Then rule(s) can be combined into a single If-Then rule by combining the conditions with logical OR.

Figure 4:
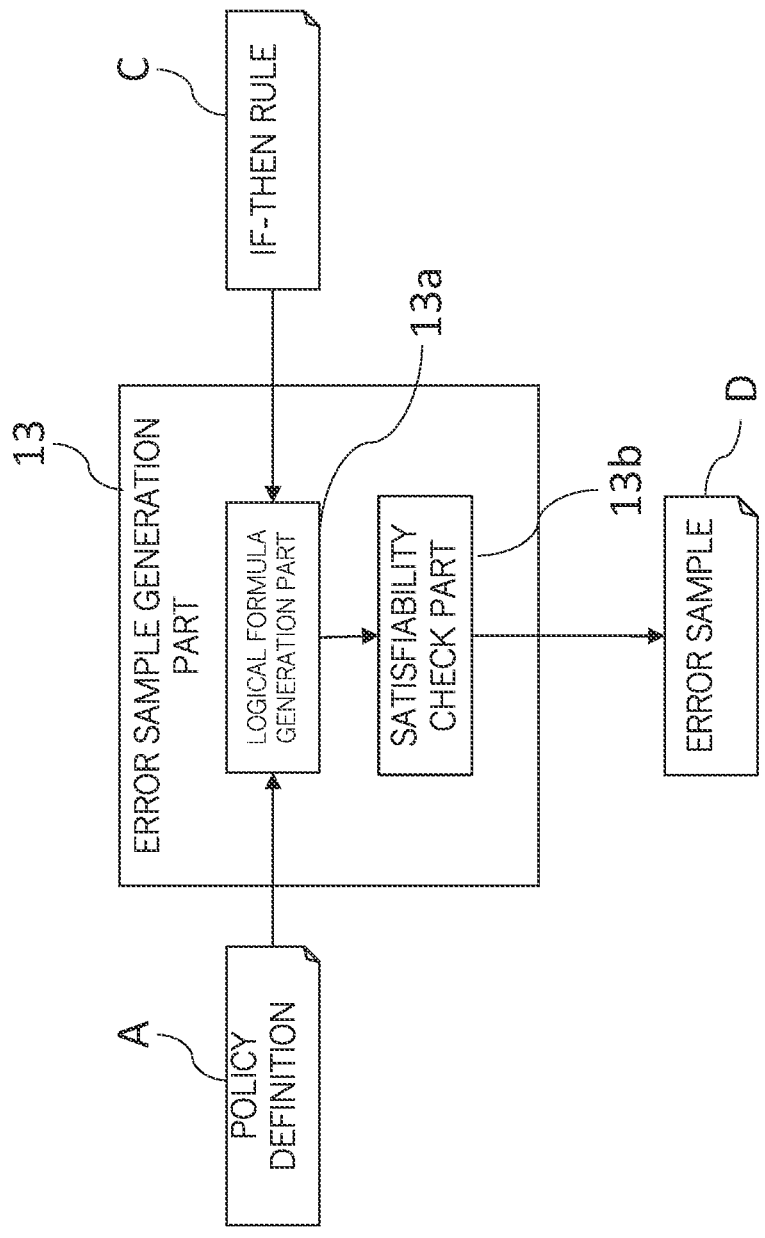
FIG. 4 is a diagram showing a configuration exemplifying an error sample generation part.

FIG. 4 is a diagram showing a configuration exemplifying an error sample generation part. As shown in FIG. 4, the error sample generation part 13 comprises logical formula generation part 13*a* and a satisfiability check part 13*b*. The logical formula generation part 13*a* generates logical formula based on the policy definition A that is input to the policy generation part 11 and the If-Then rule C generated by the policy conversion part 12. For example, the formula generation part 13*a* generates logical AND of condition that is permitted in policy definition A and a condition that is denied in If-Then rule C. In case where the condition to be permitted in the policy definition A is α1, and the condition to be denied in If-Then rule C is α2, logical AND of α1 and α2 is generated. Here, α1 and α2 are propositional logic formulas, and the generated logical formulas are also propositional logical formulas. Similarly, propositional logic formula is generated by taking logical AND of the condition that is denied in policy definition A and the condition that is permitted in If-Then rule C. Typically, the logical variables (propositions) included in these propositional logical formulas correspond to attributes such as values taking a certain range of values. For example, in case where "Nv is equal to 10 or more" is a condition for access permission regarding an attribute "the number of vulnerabilities inherent in the terminal Nv", the proposition "Nv is equal to 10 or more" becomes logical variable. The satisfiability check part 13*b* finds combinations of attribute values in which any of the logical formulas generated by the logical formula generator 13*a* is true. The satisfiability check part 13*b* can use a SAT (boolean SATisfiability problem) solver in this search. For propositional logical formulas, the SAT solver determines whether a referenced logical formula can be satisfied, and searches for assignment of Boolean values to logical variables such that satisfy the logical formula in case where it is determined that the referenced logical formula can be satisfied. In case where the referenced logical formula cannot be satisfied, it can be determined that no contradiction was found between If-Then rule C approximating the policy function and policy definition A. In case where all the generated logical formulas cannot be satisfied, the satisfiability check part 13*b* does not output an error sample D. In this case, instead of outputting the error sample D, information indicating that no contradiction is found between the policy definition and the policy function can be output. In case where the logical formula can be satisfied, based on the discovered Boolean value combinations, the combinations of attribute values can be assigned based on proposition of the referenced logical variable, and the assigned combinations of attribute values can be outputted as the error sample D. For example, in case where the logical variable corresponding to the proposition "the number of vulnerabilities Nv is equal to 10 or more" is false in the discovered Boolean value conditions, value less than 10 can be selected to be assigned as the value of Nv. Note that, the error sample D may not include all attributes. For example, the attribute values of only the three attributes within ten of the attributes may be generated as error sample(s).

In the logical formula generation part 13*a*, it is also possible to configure predicate logic formula instead of the propositional logic formula. That is, by treating the conditions of the If-Then rule(s) as predicates rather than as propositions to configure logical formulas, the logical formulas can be configured. Typically, the attribute value(s) is described as predicate that attribute value(s) is within a certain range, etc. The satisfiability check part 13*b* can search for attribute value(s) satisfying the configured predicate logic formula by using a satisfiability modulo theory (SMT) solver. By using the SMT solver, it is possible to discover combinations of attribute values more directly satisfying logical formula(s).

FIG. 5 is a diagram exemplifying a conventional method for verifying policy consistency using a sample. As shown in FIG. 5, conventionally, the consistency between the policy definition A and the policy function B has been verified by sampling in the policy function B generated from policy definition A. For example, as shown in FIG. 5, it is assumed that the policy definition A is defined to permit access in case where the attribute values X, Y and Z are all true, and to deny access in case where the attribute values X and Y are true, but the attribute value Z is false, or the attribute values X and Y are false. On the other hand, it is considered that an example in which the policy function B outputs accessibility as shown in FIG. 5 according to any combination of attribute values X, Y and Z. Note that, for simplifying the explanations, the attribute values X, Y and Z are used as logical variables taking true or false values, but they are not limited thereto. The policy definition may include arbitrary conditions using the attribute values. For example, the policy definition may include a condition such as whether a numerical variable (quantitative variable) is equal to the reference value or greater, and/or a condition such as whether a categorical variable (qualitative variable) takes a specific value. Further, the outputs of the policy function in the drawings show that the value 1 is permission and the value 0 is denial. Conventionally, in the consistency verification between the policy definition A and the policy function B, sampling for combination of attribute values X, Y and Z has been verified the consistency between policy definition A and policy function B within the scope of this sampling. For example, in case where the attribute value combination X, Y and Z indicated by the dashed line in FIG. 5 is sampled, even though the policy definition A and the policy function B are not inconsistent within this sampling range, they are defined that the access is permitted in policy function B but that the access is denied in policy definition A, in case where the attribute values X and Y outside of the sampling range (indicated by solid lines in the figure) are true and the attribute value Z is false. In other words, in the conventional verification method, it may possibly fail to correctly verify the consistency between the policy definition A and the policy function B.

Figure 6:
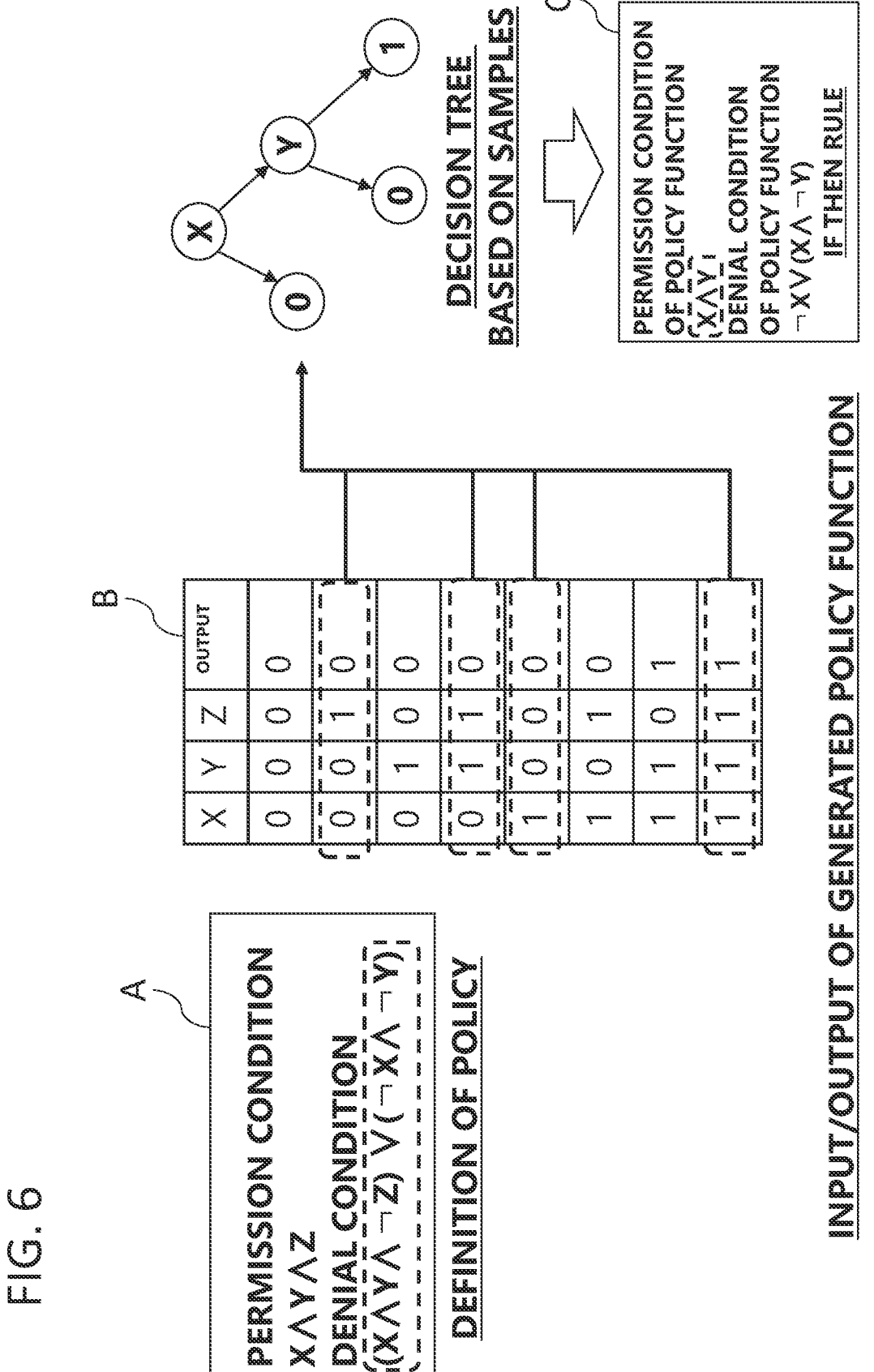
FIG. 6 is a diagram exemplifying a verification method using a policy consistency verification apparatus according to a first example embodiment.

FIG. 6 is a diagram exemplifying a verification method using a policy consistency verification apparatus according to a first example embodiment. Here, similarly to the example shown in FIG. 5, it is assumed that policy definition A is defined to permit access in case where the attribute values X, Y and Z are all true, and to deny access in case where the attribute values X and Y are true but the attribute value Z is false, or in case where the attribute values X and Y are false. Further, it is considered that an example in which the policy function B outputs access permission/denial for combination of attribute values X, Y and Z, as shown in FIG. 6. In the output of the policy function in the figure, 1 indicates permission, and 0 indicates denial. The policy consistency verification apparatus according to the first example embodiment does not directly compare policy function B and policy definition A, but instead, configures a decision tree from policy function B and generates If-Then rule C from this decision tree. Then, If-Then rule C and policy definition A are compared to verify consistency. In the decision tree of FIG. 6, a case where the attribute values in a node are true corresponds to the right child node, and a case where they are false corresponds to the left child node. Combination of conditions of nodes leading up to a leaf node using logical AND can be considered as a condition leading to the leaf node. Therefore, because the condition leading to the leaf node (the rightmost node) having value of 1 is $X \wedge Y$, the permission condition in the If-Then rule is $X \wedge Y$. Because the condition leading to a leaf node with value of 0 is $\neg X$ or $X \wedge \neg Y$, the denial condition in the If-Then rule is $\neg X \vee (X \wedge \neg Y)$. For example, in this example, in case where the attribute values X and Y are true, but the attribute value Z is false, access is permitted in If-Then rule C, however, it is defined in the policy definition A that access is denied in this case, therefore, the If-Then rule and policy definition are inconsistent. The policy consistency verification apparatus according to the first example embodiment generates $((X \wedge Y \wedge \neg Z) \vee (\neg X \wedge \neg Y)) \wedge (X \wedge Y)$ that is logical AND of the denial condition in the policy definition and the permission condition in the policy function. The satisfiability of this logical formula is determined, and the assignment in which X and Y are true, but Z is false is obtained as an assignment satisfying this logical formula. Because the logical formula is satisfied, inconsistencies between the policy function and the policy definition can be detected. In other words, the policy consistency verification apparatus according to the first example embodiment generates the If-Then rule C from the sampling for the combination of attribute values X Y and Z, because this comes down to the satisfiability problem of the logical formula generated based on access denial/permission conditions, inconsistency between the policy definition A and the policy function B can be detected, even in case where the consistency breaks down outside of the sampling range.

Second Example Embodiment

As described above, the policy consistency verification apparatus according to the first example embodiment can detect inconsistency between policy definition A and policy function B, even in case where consistency breaks down outside of the sampling range. However, because there is no guarantee that the policy function B can be reproduced completely upon generating the If-Then rule C, it may be also assumed that an accurate error sample D cannot be obtained.

Figure 7:
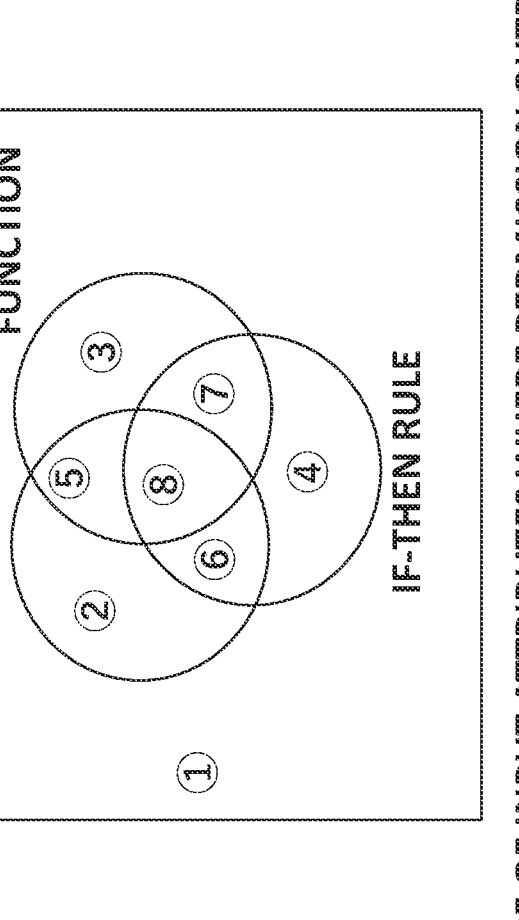
FIG. 7 is a Venn-diagram exemplifying the relationship between the policy definition, the policy function and the permission condition in the If-Then rule.

FIG. 7 is a Venn-diagram exemplifying showing the relationship between the policy definition, the policy function and the permission condition in the If-Then rule(s). As shown in FIG. 7, because each of the policy definition A, the policy function B and the If-Then rule C has access permission conditions, the range of the permission attribute values is different in each of the policy definition A, the policy function B and the If-Then rule C. Therefore, even in case where the If-Then rule and the policy definition do not match (regions 2, 4, 5 and 7), it cannot be determined to the extent whether there is error in the If-Then rule or the policy function. Thus, as shown below, the policy consistency verification apparatus according to the second example embodiment is configured by adding configurations to the policy consistency verification apparatus according to the first example embodiment.

Figure 8:
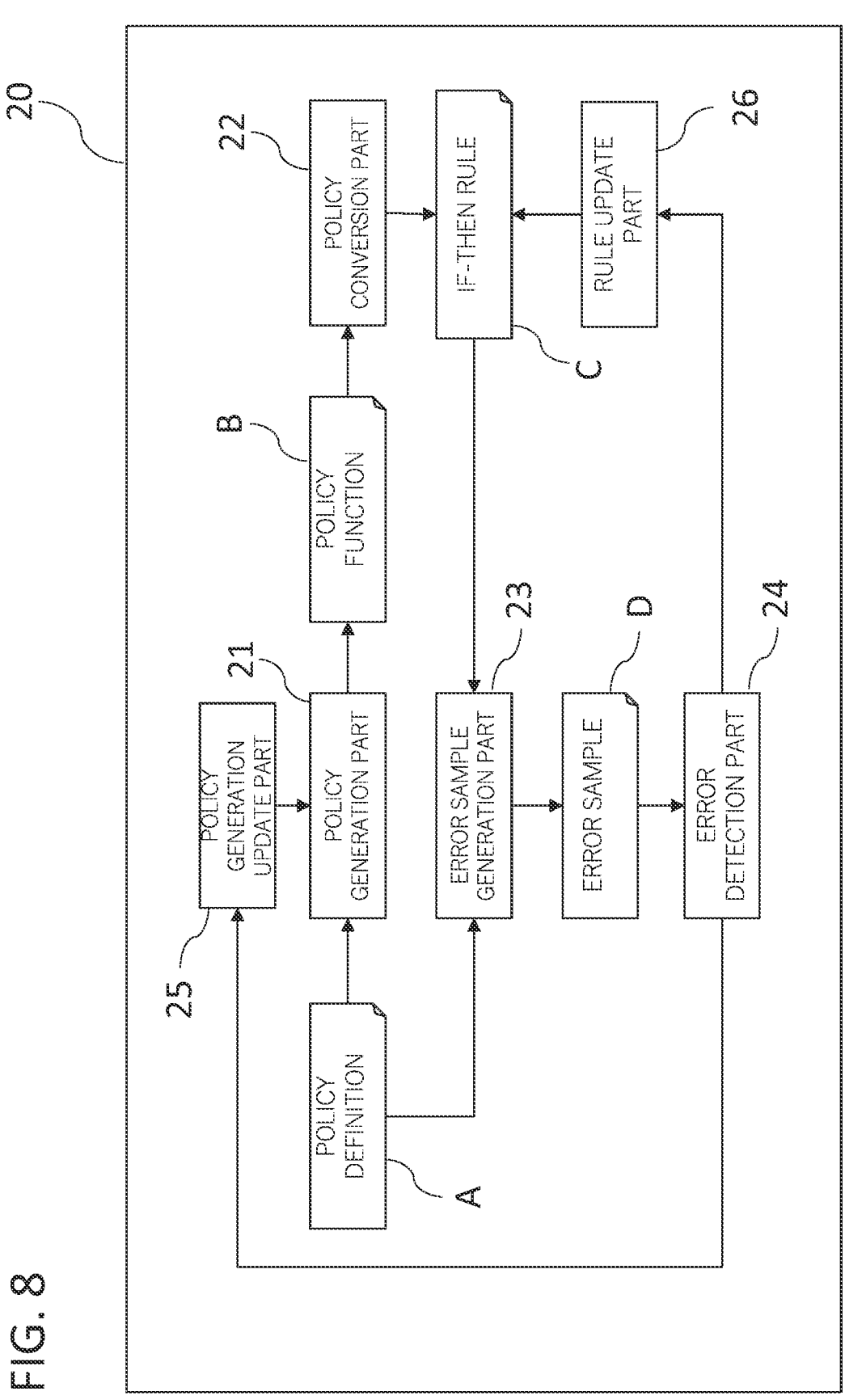
FIG. 8 is a schematic configuration diagram of a policy consistency verification apparatus according to a second example embodiment.

FIG. 8 is a schematic configuration diagram of a policy consistency verification apparatus according to a second example embodiment. As shown in FIG. 8, the policy consistency verification apparatus 20 comprises a policy generation part 21, a policy conversion part 22, an error sample generation part 23, an error determination part 24, a policy generation/update part 25 and a rule update part 26.

The policy generation part 21 is an arithmetic part generating the policy function B as machine learning model based on a policy definition A, similarly to the first example embodiment. Further, the policy conversion part 22 receives the policy function B as input to generate an If-Then rule C approximating the policy function B. The error sample generation part 23 verifies the consistency between the If-Then rule C and the policy definition A to generate an inconsistent attribute value as an error sample D.

The error determination part 24 determines whether the error sample D is error in the policy function B or error in the if-then rule C. First, the error determination part 24 generates combinations of attribute values for the obtained error sample D based on the error sample D. That is, the attribute values of the error sample D are adopted for attributes included in error sample D, and values are set for the other attribute(s) randomly from the domain of the attributes. The output of policy function B is examined for the combinations of generated attribute values. Then, in case where the outputs of the If-Then rule C and the policy function B match, the error determination part 24 determines that policy function B has problem. On the other hand, in case where the outputs of the If-Then rule C and the policy function B do not match, the error determination part 24 determines that If-Then rule C has problem.

The policy generation/update part 25 updates the processing of the policy generation part so as to improve the accuracy of the policy function B generation in case where the error determination part 24 determines that there is problem in the policy function B. For example, one or more combinations of attribute values are generated based on the error sample D, and an output indicating accessibility in case that the combinations of attribute values being determined according to the policy definition A is obtained. By adding this output to the learning input/output sample(s), additional learning can be performed by the policy generation part. On the other hand, the rule updating part 26 can update the If-Then rule(s) so as to improve the accuracy of the If-Then rule C in case where the error determination part 24 determines that there is problem in the If-Then rule C. For example, one or more combinations of attribute values are generated based on the error sample D, and an output indicating accessibility in case that the attribute value combination values being determined by a policy function is obtained. Though using this sample additionally, the decision tree can be reconfigured, and the If-Then rule C can be regenerated.

[Policy Consistency Verification Method]

Figure 9:
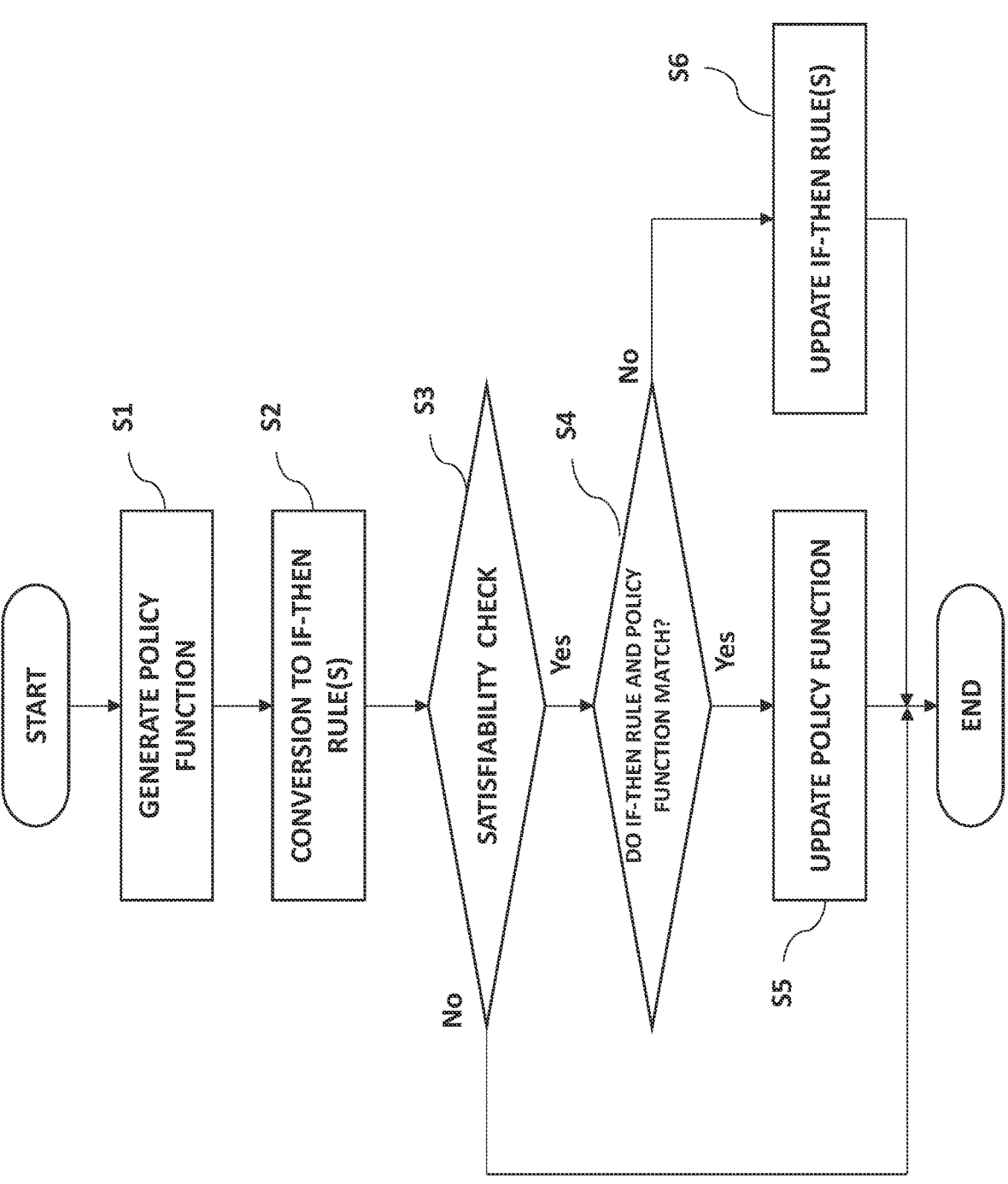
FIG. 9 is a flowchart showing a procedure for a policy consistency verification method according to one example embodiment.

FIG. 9 is a flowchart showing a procedure for a policy consistency verification method according to one example embodiment. Here, the policy consistency verification method will be explained with reference to the configurations of the policy consistency verification apparatus 10 according to the first example embodiment and the policy consistency verification apparatus 20 according to the second example embodiment, however, the policy consistency verification method itself is not limited to practical apparatus configurations.

As shown in FIG. 9, the policy consistency verification method has a step for generating the policy function (Si), a step for converting to If-Then rule(s) (S2), a step for verifying the satisfiability (S3), a determination step for determining the cause of the error (S4), a policy function update step (S5) and an If-Then rule update step (S6).

In the policy function generation step (Si), a policy function B is generated as machine learning model based on the policy definition A. The policy definition A is a file defining access attribute values and rule(s) regarding accessibility, and it is generated in advance to realize desired access control. On the other hand, the policy function B is a function for obtaining the output of accessibility from the inputs of the attribute values, and access control is performed by inputting the attributes value of the access requesting access to the policy function B to determine the accessibility according to the output of the accessibility.

In the step for converting to If-Then rule(s) (S2), the policy function B is received as input to generate the If-Then rule C approximating the policy function B. In the step for converting to If-Then rule(s) (S2), combinations of attribute values are randomly generated, the decision tree is configured for determining the accessibility in case where the determination is made according to the combinations of attribute values, and the If-Then format rule(s) is/are generated based on this decision tree. Classification and Regression Tree, etc. can be used as a method for configuring the decision tree.

In the satisfiability verification step (S3), the consistency between the policy definition A and the If-Then rule C is verified, and in case where there are attribute values satisfying the generated logical formula (S3; Yes), error sample(s) regarding inconsistent attribute values is/are generated. Practically, logical formula is generated based on the policy definition A and the If-Then rule C, and the verification of satisfiability of all generated logical formulas is performed. Logical AND of the conditions for permission in policy definition A and the conditions for denial in If-Then rule C is generated. In addition, logical AND is generated between the condition for denial in policy definition A and the condition for permission in If-Then rule C. In case where there is Boolean assignment (in case where using the SAT solver) or attribute value assignment (in case where using the SMT solver) of logical variables for which at least one of these logical formulas is true, it is determined that policy definition A and If-Then rule C are inconsistent, and the attribute values generated based on the Boolean assignment (in case where using the SAT solver) or the assignment of the attribute values (in case where using the SMT solver) are obtained as the error sample D. In case where there is no attribute value satisfying the generated logical formula (S3; No), it is determined that the policy definition and If-Then rule C match, and the process ends.

In the step for determining the cause of the error (S4), it is determined whether the error sample D is error in the policy function B or the error in the If-Then rule C. First, for the obtained error sample D, the output of the policy function B is examined. Then, it is determined that there is a problem in the policy function B in case where the outputs of If-Then rule C and policy function B match (S4; Yes). On the other hand, it is determined that there is problem in the If-Then rule C in case where the outputs of If-Then rule C and policy function B do not match (S4; No).

In case where the outputs of If-Then rule C and policy function B match (S4; Yes), the accuracy of the policy function B is improved by additional learning based on the error sample D in the policy function update step (S5). On the other hand, in case where the outputs of If-Then rule C and policy function B do not match (S4; No), the accuracy of the If-Then rule(s) is improved by regenerating the If-Then rule(s) based on error sample D in the If-Then rule updating step (S6).

Note that, it is described in the flowchart shown in FIG. 9 that the policy consistency verification method ends in case where the policy function update step (S5) or the If-Then rule update step (S6) is completed, however, they are also possible that the policy consistency verification method is executed again after the policy function update step (S5) or the If-Then rule update step (S6), then that the policy consistency verification and updating of policy function B or If-Then rule C are repeated until no error sample is generated.

Modified Example Embodiment

The first example embodiment and the second example embodiment may also be performed as the following modified example embodiments. The modified example embodiment described below can adopt the same configurations as the first example embodiment and the second example embodiment, so here, the modified example embodiment will be described with reference to the configurations of the first example embodiment and the second example embodiment.

(Utilization of Access Log/Communication Log Information)

The policy conversion part 12 receives the policy function B input and generates the If-Then rule C approximating the policy function B. In this case, a check target input/output sample generation part 12a of the policy conversion part 12 generates check target input/output sample(s) from the policy function B, however, in this process, sample(s) to be input to the policy function B can also be generated based on information such as past access logs and communication logs. Probability distribution of attribute values is determined based on the number of times appearing in the log, and attribute values at generation of input/output sample(s) is/are also determined according to the probability distribution. In this way, input values that are more likely to be actually used than those generated randomly can be checked as sample(s) to be input to the policy function B.

(Utility of Policy Definition Information)

In case where the learning input/output sample generation part 11a of the policy conversion part 12 generates input/output sample(s) from the policy definition A, the number of appearances of attributes in the policy definition A can be utilized. For example, usage frequency distribution of attributes is calculated based on the number of appearances, and referenced attribute values at the time of input/output sample generation are determined according to the referenced usage frequency distribution. Because the more times an attribute appears, the more likely it is to be an important attribute for the user who generates the policy, it can be checked more intensively (trying all patterns for the attribute values that should be checked intensively, leaving the others fixed, etc.).

Further, the rule configuration part 12b of the policy conversion part 12 configures the decision tree based on the input/output samples to be checked and generates the If-Then format rule(s) based on the decision trees, however, attribute values to be used as dividing conditions upon configuration of the decision tree can be selected based on the usage frequency distribution of the attributes. That is, index such as impurity is normally used at selection of dividing condition, however, the impurity may be multiplied by coefficient based on the frequency distribution so that attributes appearing frequently are actively selected. Because the more frequently the attribute values appear, the more likely they are to be related to decision, it can be expected that the decision tree will perform the more accurate determination.

(Creation of Multiple Decision Trees Upon Generation if-then Rule(s))

The rule configuration part 12b of the policy conversion part 12 configures the decision tree based on the input/output samples to be checked and generates If-Then format rule(s) based on the decision tree, however, the decision tree may not be limited to one. A plurality of the decision trees may also be configured by focusing on particular attributes. For example, each of the cases that the action is "read", that the action is "write" and that the action is "execute", the decision tree can be configured for each case. Furthermore, the decision tree can be configured for each of access destination resource types. In case where configuring a plurality of the decision trees, the logical formula generating part 13a of the error sample generating part 13 can independently generate logical formula for each of the decision trees. That is, logical formula is generated for each of the decision trees based on the If-Then rule(s) and the policy definitions generated from the referenced decision tree. The satisfiability check part 13b performs satisfiability test on each generated logical formula to output combinations of attribute values, as the error sample D satisfying the referenced logical formula for those that are satisfiable.

Furthermore, attributes to be used upon configuration of the decision tree may be determined based on the correlation of attributes included in the access logs and the policy definitions. For example, in case where configuring the decision tree with input whose access destination resource type is "development server", priority for usage can be given to attribute values appearing frequently (strongly correlated) in definitions including "development server" in the policy definition as the decision tree dividing condition. Practically, it may be possible to preferentially use attributes that are used frequently as division conditions by calculating the usage frequency distribution of the attributes in the policy definition and multiplying the impurity by coefficient based on the usage frequency distribution in case where searching for division conditions.

(Generation of Error Sample(s) Based on if-then Condition)

In case where one error sample is found, there is a high possibility that are with the same conditions (classified as the same node in the decision tree) are also errors. Therefore, generating error sample(s) based on the conditions of the If-Then rule(s) can be expected to efficiently expand the error samples. Practically, an attribute value combination is generated based on the error sample D after obtaining the error sample D. Leaf nodes into which combinations of attribute values generated on the decision tree are classified. It is possible to efficiently discover sample(s) in which the If-Then rule(s) and the policy definitions are inconsistent by searching for combinations of attribute values that can be classified into leaf nodes identified in this way. It is possible to expand the data for relearning used in the processing of the policy generation/updating part by expanding the number of error samples. In other words, the processing of the policy generation/updating part can be performed more efficiently.

In the above example embodiments, for the sake of simplicity, the policy definition and the policy function are determined in two ways, permission and denial, however, the present invention is not limited thereto. For example, determination results such as conditional permission, conditional denial and inability to determine may be output, and the system may be configured to have three or more types of determination results R. In this case, for each r∈R, the logical formula generation part 13a can generate logical AND of the condition in which the determination result is r in the policy definition and the condition in which the determination result is other than r in the If-Then rule(s). Similarly, it is possible to generate logical formula that is logical AND of condition in which the determination result is r in If-Then condition and a condition in which the determination result is other than r in the policy definition.

Figure 10:
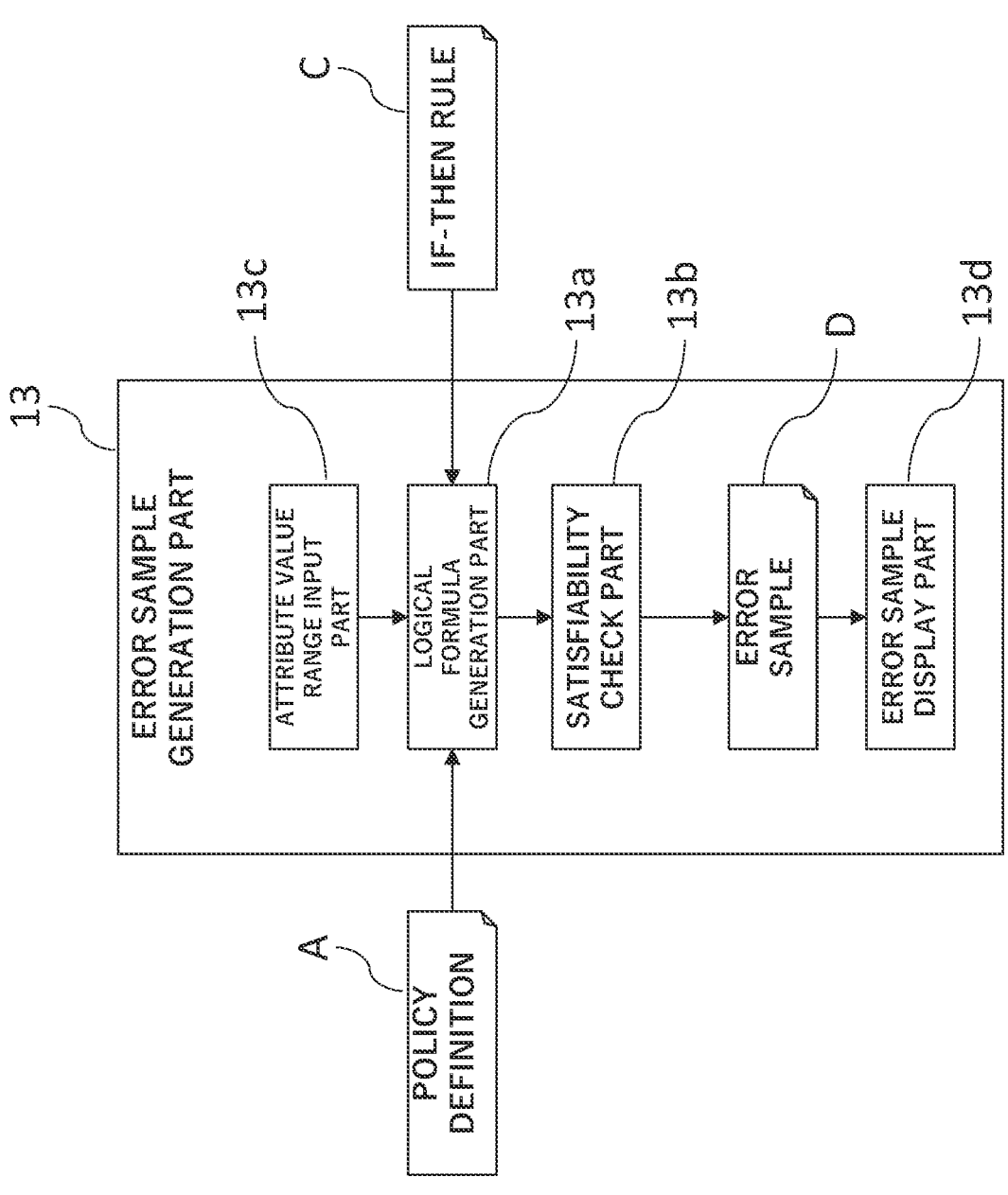
FIG. 10 is a diagram showing a modified example of an error sample generation part.

In general, SAT solver and SMT solver can output an example assignment satisfying logical formula in case where the logical formula can be satisfied. On the other hand, in practice, in case where checking the consistency of the policies, there may be cases in which whether the consistency of the policies is verified under particular conditions. Therefore, in case where an example assignment satisfying logical formula is outside of the range of the referenced condition, desired verification may possibly not be performed. In order to solve this problem, in the processing of the error sample generation part, it is possible to generate error sample(s) describing a range of some attribute values. FIG. 10 is a diagram showing a modified example of an error sample generation part. In this modification, the error sample generation part 13 has attribute value range input part 13c. The attribute value range input part 13c is a user interface receiving input of a range of values taken by attribute values included in the error sample for one or more access attributes. The error sample generation part 13 can generate logical formula based on the conditions of the range of values that the attribute values designated by the attribute value range input part 13c can take. It is possible to configure logical formula reflecting the conditions described in the attribute value range input part in case where generating propositional logical formula in the logical formula generating part 13*a* by performing logical AND operation between the logical formula generated based on the If-Then rule(s) and the policy definition and the logical variable indicating the condition described in the attribute value range input part 13*c*. It is possible to configure logical formula reflecting the conditions described in the attribute value range input part in case where generating predicate logical formula in the logical formula generation part 13*a* by adding the condition described in the attribute value range input part to the predicate logical formula generated based on the If-Then rule(s) and the policy definitions.

Further, the error sample generation part 13 may have error a sample display part 13*d*. The error sample display part is a user interface displaying generated error sample(s). The user checks the output of the error sample display part and can cause the error sample generation part to perform error sample generation process again by inputting conditions related to attribute values in the attribute value range input part in case where error sample is not obtained under the desired conditions.

Hardware Configuration Example

Figure 11:
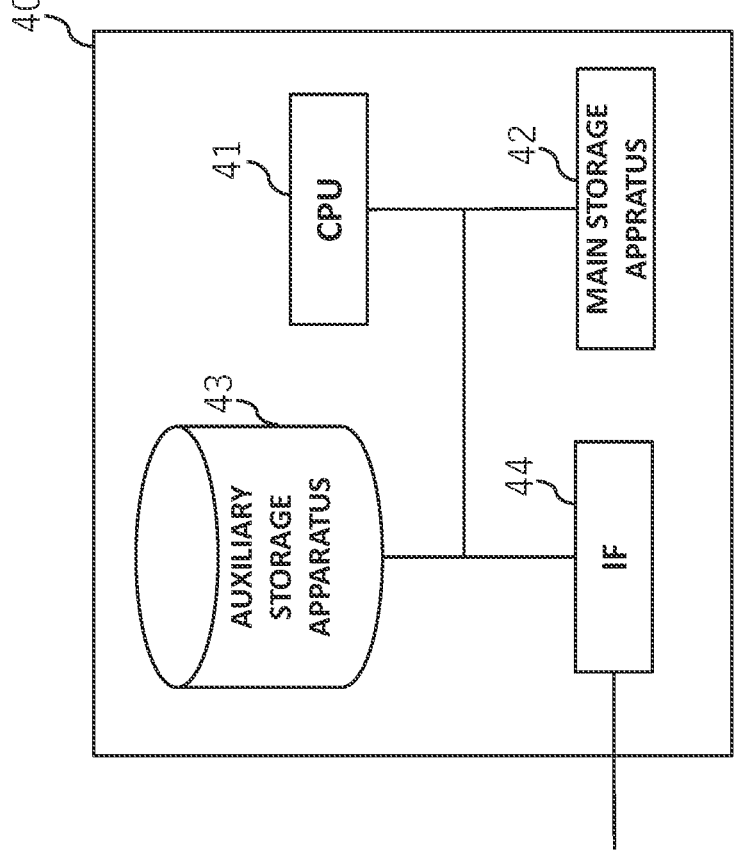
FIG. 11 is a diagram showing a hardware configuration exemplifying the policy consistency verification apparatus.

FIG. 11 is a diagram showing a hardware configuration exemplifying the policy consistency verification apparatus. An information processing apparatus (computer) employing the hardware configuration shown in FIG. 11 makes it possible to realize each function of the policy consistency verification apparatuses 10 and 20 described above. Note that, the exemplified hardware configuration shown in FIG. 11 is an example of the hardware configuration for realizing each function of the policy consistency verification apparatuses 10 and 20 but it is not intended to limit the hardware configuration of the policy consistency verification apparatuses 10 and 20 as exemplified. The policy consistency verification apparatuses 10 and 20 may include hardware not shown in FIG. 11.

As shown in FIG. 11, a hardware configuration 40 that can implement the policy consistency verification apparatuses 10 and 20 comprises a CPU (Central Processing Part) 41, a main storage apparatus 42, an auxiliary storage apparatus 43 and an IF (Interface) part 44 that can be interconnected by an internal bus.

The CPU 41 executes each command included in the program executed by the policy consistency verification apparatuses 10 and 20. The main storage apparatus 42 is RAM (Random Access Memory), for example, and temporarily stores various programs executed by the policy consistency verification apparatuses 10 and 20 so that the CPU 41 can process them.

The auxiliary storage apparatus 43 is HDD (Hard Disk Drive), for example, and can keep storing various programs executed by the policy consistency verification apparatuses 10 and 20 over a medium term to a long term. The various programs can be provided as program products stored on non-transitory computer-readable storage media. The auxiliary storage apparatus 43 can be used for medium-to long-term storage of various programs stored in non-temporary computer-readable recording media. The IF part 44 provides an interface regarding communication between the policy consistency verification apparatuses 10 and 20 and external information processing apparatuses.

The information processing apparatus employing the hardware configuration 40 as described above can realize each function of the policy consistency verification apparatuses 10 and 20.

Some or all of the above example embodiments may also be described as in each following note, however not limited thereto.

[Note 1]

A policy consistency verification apparatus, comprising: a policy conversion part configured to generate an If-Then rule approximating a policy function used as an input, wherein the policy function is generated from policy definition defining attribute value of access and a rule regarding accessibility to obtain an output of accessibility from inputs of the attribute value; and an error sample generation part configured to verify consistency between the If-Then rule and the policy definition to generate inconsistent attribute value as an error sample.

[Note 2]

The policy consistency verification apparatus according to NOTE 1, wherein the error sample generation part obtains the error sample by performing satisfiability check on logical formula generated based on the If-Then rule and the policy definition.

[Note 3]

The policy consistency verification apparatus according to NOTE 1 or 2, wherein the policy conversion part randomly generates combination of the attribute values, configures a decision tree from outputs obtained by inputting the attribute value combination into the policy function to generate the If-Then rule from the decision tree.

[Note 4]

The policy consistency verification apparatus according to any one of NOTEs 1 to 3, further comprising: a policy generation part configured to generate the policy function as machine learning model based on the policy definition; and a policy generation update part configured to generate learning data based on the error sample(s), and to update the policy generation part.

[Note 5]

The policy consistency verification apparatus according to any one of NOTEs 1 to 4, further comprising: a rule update part configured to update the If-Then rule based on the error sample(s).

[Note 6]

The policy consistency verification apparatus according to any one of NOTEs 1 to 5, wherein it is determined whether the error sample is an error caused by the policy function or an error caused by the If-Then rule, and based on the result of the determination, it is judged whether the policy generation part is updated or the If-Then rule is updated.

[Note 7]

A policy consistency verification method, comprising: converting a policy for generating an If-Then rule approximating a policy function used as an input, wherein the policy function is generated from policy definition defining attribute value of access and a rule regarding accessibility to obtain an output of accessibility from inputs of the attribute value; and generating an error sample for verifying consistency between the If-Then rule and the policy definition to generate inconsistent attribute value as an error sample.

[Note 8]

The policy consistency verification method according to NOTE 7, comprising:

determining whether the error sample is an error caused by the policy function or an error caused by the If-Then rule; updating a policy generation part that generates training data based on the error sample to generate the policy function as a machine learning model based on the policy definition in case where the error is caused by the policy function; and updating the If-Then rule based on the error sample in case where the error is caused by the If-Then rule.

[Note 9]

A non-transient computer readable medium storing a policy consistency verification program that causes a computer to verify a policy consistency, the computer comprising a processor that execute a program and a memory that stores the program, the program comprising: a policy conversion process for generating an If-Then rule using a policy function as an input to approximate the policy function, wherein the policy function is generated from a policy definition defining a rule regarding an attribute value of an access and an accessibility; and an error sample generation process for verifying consistency between the If-Then rule and the policy definition to generate inconsistent attribute value as an error sample.

[Note 10]

The non-transient computer readable medium storing the policy consistency verification program according to NOTE 9, comprising: determining whether the error sample is an error caused by the policy function or an error caused by the If-Then rule; generating training data based on the error sample in case where the error is caused by the policy function; updating the policy generation part generating the policy function as a machine learning model based on the error sample; and updating the If-Then rule based on the error sample in case where the error is caused by the If-Then rule.

In the present invention, it is self-evident that a computer is used in case where an algorithm, software or flowchart or automated process step is shown, and it is also self-evident that the computer is equipped with a processor and a memory or storage apparatus. Therefore, even though these elements are not explicitly stated, it is understood that these elements are inevitably described in the present application.

Further, the disclosure of the patent literature cited above is incorporated herein in its entirety by reference thereto. It is to be noted that it is possible to modify or to adjust the example embodiments or examples within the scope of the whole disclosure of the present invention (including the claims) and based on the basic technical concept thereof. Further, it is possible variously to combine or to select (or partially to omit) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be achieved by a person skilled in the art according to the whole disclosure including the claims and the technical concept of the present invention. Particularly, any numerical ranges described herein should be interpreted that any intermediate values or subranges falling within the referenced ranges are also practically disclosed even without specific recital thereof. In addition, using some or all of the disclosed matters in the literature cited above as necessary, in combination with the matters described herein, as part of the disclosure of the present invention in accordance with the object thereof shall be considered to be included in the disclosed matters of the present application.

REFERENCE SIGNS LIST 10, 20 POLICY CONSISTENCY VERIFICATION APPARATUS 11, 21 POLICY GENERATION PART
12, 22 POLICY CONVERSION PART
13, 23 ERROR SAMPLE GENERATION PART
24 ERROR DETERMINATION PART
25 POLICY GENERATION UPDATE PART
26 RULE UPDATE PART
11a LEARNING INPUT/OUTPUT SAMPLE GENERATION PART
11b MACHINE LEARNING PART
12a CHECK TARGET INPUT/OUTPUT SAMPLE GENERATION PART
12b RULE CONFIGURATION PART
13a LOGICAL FORMULA GENERATION PART
13b SATISFIABILITY CHECK PART
13c ATTRIBUTE VALUE RANGE INPUT PART
13d ERROR SAMPLE DISPLAY PART
40 HARDWARE CONFIGURATION
41 CPU
42 MAIN STORAGE APPARATUS
43 AUXILIARY STORAGE APPARATUS
44 IF (INTERFACE) PART
A POLICY DEFINITION
B POLICY FUNCTION
C IF-THEN RULE
D ERROR SAMPLE
E RISK/NEEDS INFORMATION

What is claimed is:

1. A policy consistency verification apparatus, comprising:

at least one processor; and a memory communicatively coupled to the at least one processor, wherein the at least one processor is configured to execute program instructions stored in the memory to:

generate an If-Then rule approximating a policy function used as an input, wherein the policy function is generated from a policy definition defining an attribute value of access and a rule regarding accessibility to obtain an output of accessibility from inputs of the attribute value; and verify consistency between the If-Then rule and the policy definition to generate an inconsistent attribute value as an error sample;

wherein generating the If-Then rule comprises:

randomly generating a combination of attribute values;

configuring a decision tree from outputs obtained by inputting the combination of attribute values into the policy function; and generating the If-Then rule from the decision tree.

2. The policy consistency verification apparatus according to claim 1, wherein the at least one processor is further configured to execute the program instructions to:

obtain the error sample by performing satisfiability check on a logical formula generated based on the If-Then rule and the policy definition.

3. The policy consistency verification apparatus according to claim 1, wherein the at least one processor is further configured to execute the program instructions to:

generate the policy function as a machine learning model based on the policy definition;

generate learning data based on the error sample; and update the machine learning model.

4. The policy consistency verification apparatus according to claim 3, wherein the at least one processor is further configured to execute the program instructions to:

update the If-Then rule based on the error sample.

5. The policy consistency verification apparatus according to claim 4, wherein the at least one processor is further configured to execute the program instructions to:

determine whether the error sample is an error caused by the policy function or an error caused by the If-Then rule; and judge, based on a result of the determination, whether the policy function is updated or the If-Then rule is updated.

6. A policy consistency verification method, comprising:

converting, by at least one processor, a policy for generating an If-Then rule;

generating, by the at least one processor, the If-Then rule approximating a policy function used as an input, wherein the policy function is generated from policy definition defining an attribute value of access and a rule regarding accessibility to obtain an output of accessibility from inputs of the attribute value, and wherein the If-Then rule is generated from a decision tree configured from outputs obtained by inputting a randomly generated combination of attribute values into the policy function; and generating, by the at least one processor, an error sample for verifying consistency between the If-Then rule and the policy definition, and generating based on the verification, an inconsistent attribute value as the error sample.

7. The policy consistency verification method according to claim 6, comprising:

determining whether the error sample is an error caused by the policy function or an error caused by the If-Then rule;

in a case where the error is caused by the policy function, updating a policy generation part that generates training data based on the error sample to generate the policy function as a machine learning model based on the policy definition; and in a case where the error is caused by the If-Then rule, updating the If-Then rule based on the error sample.

8. The policy consistency verification method according to claim 6, wherein obtaining the error sample by performing a satisfiability check on a logical formula generated based on the If-Then rule and the policy definition.

9. A non-transitory computer readable medium storing a policy consistency verification program that causes a computer to verify a policy consistency, the computer comprising at least one processor that executes a program, and a memory that stores the program, the program comprising:

a policy conversion process configured to generate an If-Then rule using a policy function as an input to approximate the policy function, wherein the policy function is generated from a policy definition defining a rule regarding an attribute value of an access and an accessibility, and wherein the If-Then rule is generated from a decision tree configured from outputs obtained by inputting a randomly generated combination of attribute values into the policy function; and an error sample generation process configured to verify consistency between the If-Then rule and the policy definition to generate an inconsistent attribute value as an error sample.

10. The non-transitory computer readable medium storing the policy consistency verification program according to claim 9, comprising:

determining whether the error sample is an error caused by the policy function or an error caused by the If-Then rule;

in a case where the error is caused by the policy function, generating training data based on the error sample;

updating, based on the error sample, a machine learning model configured to generate the policy function based on the policy definition; and in a case where the error is caused by the If-Then rule, updating the If-Then rule based on the error sample.

11. The non-transitory computer readable medium storing the policy consistency verification program according to claim 9, wherein obtaining the error sample by performing a satisfiability check on a logical formula generated based on the If-Then rule and the policy definition.

\* \* \* \* \*